United States Patent
Chang

(10) Patent No.: US 11,907,430 B2
(45) Date of Patent: Feb. 20, 2024

(54) SMART GLASSES

(71) Applicant: NANJING SILERGY MICRO (HK) CO., LIMITED, Causeway Bay (HK)

(72) Inventor: Chia-Lin Chang, Taipei (TW)

(73) Assignee: NANJING SILERGY MICRO (HK) CO., LIMITED, Causeway Bay (HK)

(*) Notice: Subject to any disclaimer, the term of this patent is extended or adjusted under 35 U.S.C. 154(b) by 0 days.

(21) Appl. No.: 17/477,611

(22) Filed: Sep. 17, 2021

(65) Prior Publication Data

US 2022/0164031 A1    May 26, 2022

(30) Foreign Application Priority Data

Nov. 20, 2020 (CN) .......................... 202011307802.9

(51) Int. Cl.
*G06F 3/01* (2006.01)
*H01Q 1/27* (2006.01)
*G06F 3/14* (2006.01)

(52) U.S. Cl.
CPC ................ *G06F 3/017* (2013.01); *G06F 3/14* (2013.01); *H01Q 1/273* (2013.01)

(58) Field of Classification Search
CPC ............ G06F 3/017; G06F 3/14; H01Q 1/273
See application file for complete search history.

(56) References Cited

U.S. PATENT DOCUMENTS

| | | | |
|---|---|---|---|
| 11,016,542 B1* | 5/2021 | Zhang | G02B 27/017 |
| 2014/0273893 A1* | 9/2014 | Katayama | H04N 5/64 |
| | | | 455/90.3 |
| 2018/0212314 A1* | 7/2018 | Rautio | G02C 5/22 |
| 2019/0175919 A1* | 6/2019 | Poon | A61N 7/00 |
| 2019/0289557 A1* | 9/2019 | Li | H04W 52/241 |
| 2020/0029050 A1* | 1/2020 | Antunes | H04N 5/23245 |

* cited by examiner

*Primary Examiner* — Sahlu Okebato
(74) *Attorney, Agent, or Firm* — Amin, Turocy & Watson, LLP

(57) ABSTRACT

Smart glasses, comprising a body, at least one antenna module, a radio frequency module, a sensing module and a processing module. The at least one antenna module is disposed on the body; the radio frequency module is coupled with the antenna module and used to receive or transmit a radio frequency signal by the antenna module; the sensing module is coupled with the antenna module and used to sense a capacitance value of a parasitic capacitance of the antenna module and generate a corresponding sensing signal; and the processing module is connected with the radio frequency module and the sensing module, wherein the processing module is used to run a corresponding application according to the radio frequency signal or the sensing signal.

12 Claims, 6 Drawing Sheets

SMART GLASSES

RELATED APPLICATIONS

The present application claims the priority of Chinese Application No. 202011307802.9, filed Nov. 20, 2020, the disclosure of which is hereby incorporated by reference herein in its entirety.

BACKGROUND OF THE INVENTION

1. Field of the Invention

The present disclosure generally relates to smart glasses, and, more particularly, to smart glasses capable of receiving user operation instructions.

2. Description of the Related Art

In general, augmented reality (AR) or virtual reality (VR) can be achieved by smart glasses, and smart glasses are capable of playing video/audio information, such as music or films. Smart glasses can receive operation instructions or data signals from an external device, such as a mobile phone, by the antenna.

On the other hand, users would expect some functions, such as the function of wearing detection and gesture-control in the smart glasses. However, the inner space of the smart glasses are limited and most of the space is occupied by antennas, video/audio components. It is difficult to add additional components in smart glasses in the prior art. Therefore, how to provide smart glasses that can integrate the antenna and are capable of wearing detection and gesture-control has become an urgent problem to be solved in the industry.

SUMMARY OF THE INVENTION

In light of solving the foregoing problems of the prior art, the present invention provides smart glasses that can integrate the antenna and are capable of wearing detection and gesture-control.

The present invention provides smart glasses which comprise a body, at least one antenna module, a radio frequency module, a sensing module and a processing module.

The at least one antenna module is disposed on the body; the radio frequency module is coupled with the antenna module and used to receive or transmit a radio frequency signal by the antenna module; the sensing module is coupled with the antenna module and used to sense a capacitance value of a parasitic capacitance of the antenna module and generate a corresponding sensing signal; and the processing module is connected with the radio frequency module and the sensing module, wherein the processing module is used to run a corresponding application according to the radio frequency signal or the sensing signal.

In an embodiment, the antenna module comprises a plurality of conductor elements; wherein the plurality of conductor elements are coupled to each other through a first capacitor structure.

In an embodiment, the first capacitor structure is a distributed capacitor structure or a lumped distributed capacitor structure.

In an embodiment, the radio frequency module is coupled with the antenna module through a second capacitor structure.

In an embodiment, the second capacitor structure is a distributed capacitor structure or a lumped distributed capacitor structure.

In an embodiment, the sensing module is coupled with the antenna module through a first inductor.

In an embodiment, the processing module is further used to determine a distance between a first object and the antenna module or whether the first object contacts the antenna module according to the sensing signal.

In an embodiment, the body further comprises a temple and a rim, which are connected to each other, wherein the antenna module is disposed on the temple or the rim.

In an embodiment, the smart glasses comprise a plurality of antenna modules and the smart glasses further comprises a radio frequency switch. The radio frequency switch is connected the radio frequency module with the plurality of antenna modules, and the radio frequency switch is used to connect the radio frequency module to either of the plurality of antenna modules according to strength of the radio frequency signals received or transmitted by the plurality of antenna modules.

In an embodiment, the smart glasses further comprise a storage module. The storage module is connected with the processing module, and the storage module is used to store the application.

In an embodiment, the smart glasses further comprise a power module. The power module is connected with the processing module, and the power module is used to supply required power to the radio frequency module, the sensing module and the processing module for the operation thereof.

In an embodiment, the smart glasses further comprise a microphone module. The microphone module is connected with the processing module, and the microphone module is used to convert an external audio signal into a digital audio signal.

In an embodiment, the smart glasses further comprise a video/audio module. The a video/audio module is connected with the processing module, and the application is used to control the video/audio module to play corresponding video/audio signal.

Compared to the prior art, the smart glasses according to the present invention comprise at least one antenna disposed on the body and the radio frequency module and the sensing module share the antenna module as a radiator. The function of wearing detection and gesture-control in the smart glasses of the present invention may be achieved. The function of gesture-control is achieved by integrating the existing antenna, so it is not required to add additional components. The inner space of the smart glasses can be used efficiently. Moreover, the antenna module may comprise a plurality of conductor elements to sense the user's operation gesture.

DETAILED DESCRIPTION

The present invention is described by the following specific embodiments. Those with ordinary skills in the arts can readily understand other advantages and functions of the present invention after reading the disclosure of this specification. Any changes or adjustments made to their relative relationships, without modifying the substantial technical contents, are also to be construed as within the range implementable by the present invention.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Figure 1:
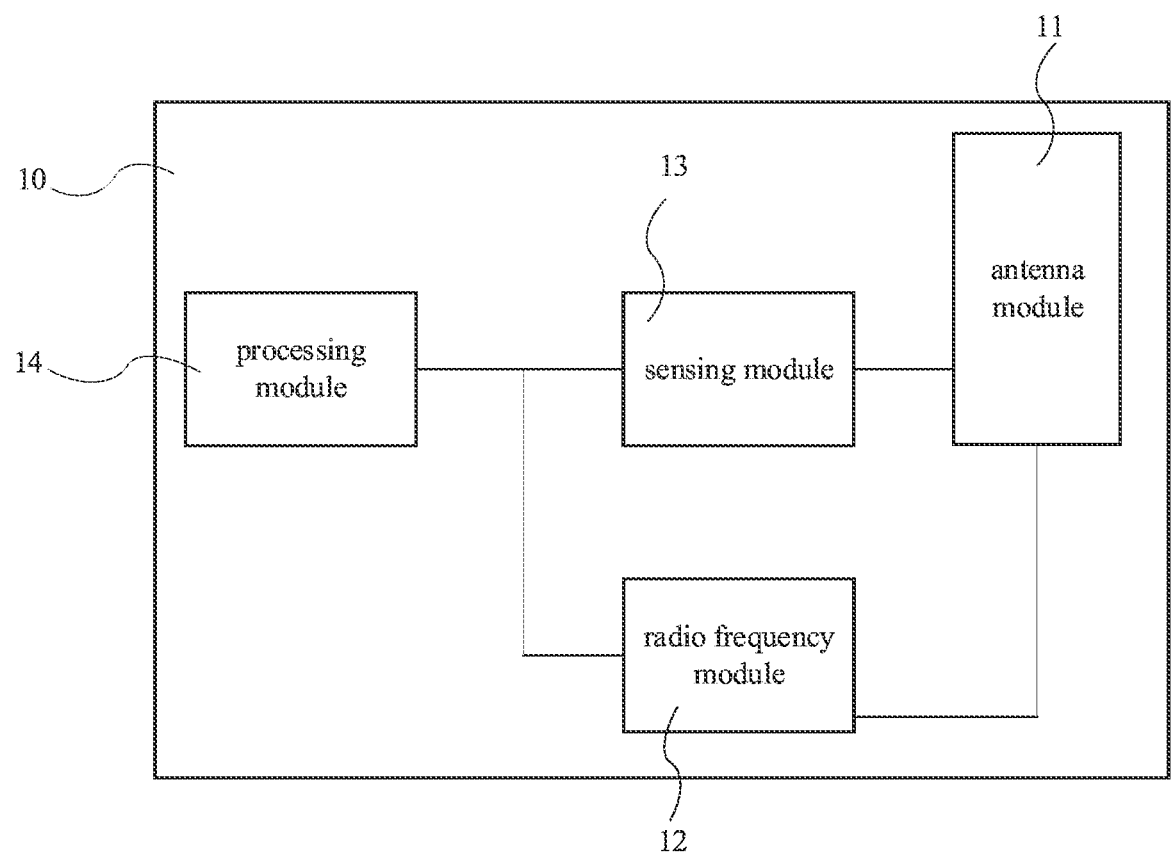
FIG. 1 illustrates a schematic view of a structure of the smart glasses according to a first embodiment of the present invention.

Please refer to FIG. 1. FIG. 1 illustrates a schematic view of a structure of the smart glasses according to a first embodiment of the present invention. As shown in the figure, the smart glasses according to the present invention comprise a body 10, at least one antenna module 11, a radio frequency module 12, a sensing module 13 and a processing module 14.

The body 10 may be put on a user's head and include parts, but not limited to, such as rims, temples, lenses. The parts of the body may be designed as required.

The at least one antenna module 11 is disposed on the body 10. The radio frequency module 12 is coupled with the antenna module 11 and the radio frequency module 12 is used to receive or transmit a radio frequency signal by the antenna module 11. In this embodiment, the smart glasses comprise one antenna module 11, but in other embodiments, the smart glasses may comprise more antenna modules 11 to extend the coverage of the antenna for receiving signals. The radio frequency signal is a high frequency signal. For example, the radio frequency signal can be, but not limited to, electromagnetic wave signals in Wi-Fi frequency band, LTE frequency band or 5G New Radio frequency band under the standards thereof.

The sensing module 13 is coupled with the antenna module 11. The sensing module 13 is used to sense a capacitance value of a parasitic capacitance of the antenna module 11 and generate a corresponding sensing signal. The sensing module 13 generates the corresponding sensing signal according to a change of the capacitance value of the parasitic capacitance. The change of the capacitance value is a low frequency signal. Whether the antenna module 11 is touched by an object (such as a part of a human body) or the antenna module 11 is approached by an object (such as a part of a human body) in a predetermined distance, e.g. gesture-control or the glasses being put on the head, can be determined according to the capacitance value measured by the sensing module 13.

The processing module 14 is connected with the radio frequency module 12 and the sensing module 13, wherein the processing module 14 is used to run a corresponding application according to the radio frequency signal or the sensing signal. For example, the processing module 14 may run an application, such as augmented reality application, a virtual reality application or an application to play music or video, or may execute other control instructions. The processing module 14 may be, for example, a processor chip.

Figure 2:
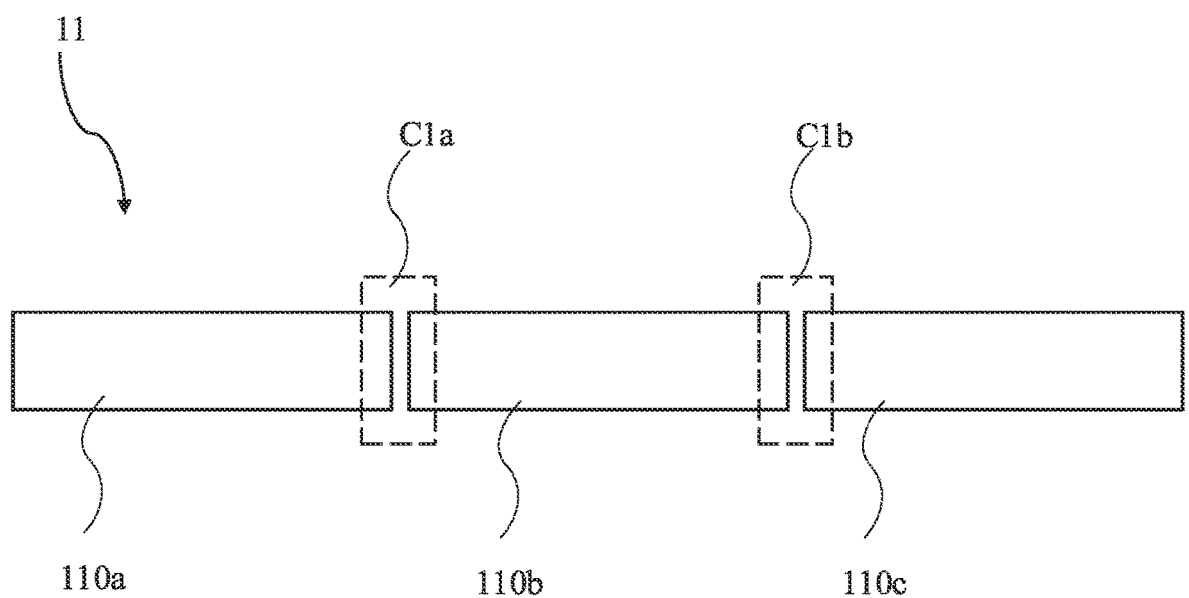
FIG. 2 illustrates a schematic view of a structure of the antenna module according to a second embodiment of the present invention.

Please refer to FIG. 2. FIG. 2 illustrates a schematic view of a structure of the smart glasses according to a second embodiment of the present invention. In an embodiment, the antenna module 11 may comprise a plurality of conductor elements 110a, 110b, and 110c. The conductor elements 110a, 110b, and 110c are coupled through first capacitor structures C1a and C1b. The first capacitor structures C1a and C1b can isolate the low frequency signals among the conductor elements 100a, 100b, and 100c. Furthermore, because the change of the capacitance value of the parasitic capacitance is a low frequency signal, the isolation of the low frequency signals among the conductor elements 110a, 110b, and 110c indicates that the change of the capacitance value of the parasitic capacitance of each of the conductor elements 110a, 110b, and 110c can be sense individually. As a result, the sensing module 13 can sense the gesture or the sequence or the order of the contacts by the user by the conductor elements 110a, 110b, and 110c, more than the contacts between the user and the conductor elements. In other embodiments, the antenna module 11 may comprise different numbers of conductor elements, such as two or more.

In an embodiment, the first capacitor structures C1a and C1b may be distributed capacitor structures. For example, the distributed first capacitor structure C1a can be formed by reducing the distance between adjacent conductor elements 110a and 110b and making the shape of the edge of the conductor element 110a correspond to the shape of the edge of the conductor element 110b.

In another embodiment, the first capacitor structures C1a and C1b may be lumped distributed capacitor structures disposed among the conductor elements 110a, 110b, and 110c. For example, the lumped distributed capacitor structure may be a multi-layer ceramic capacitor (MLCC), but not limited to.

Figure 3:
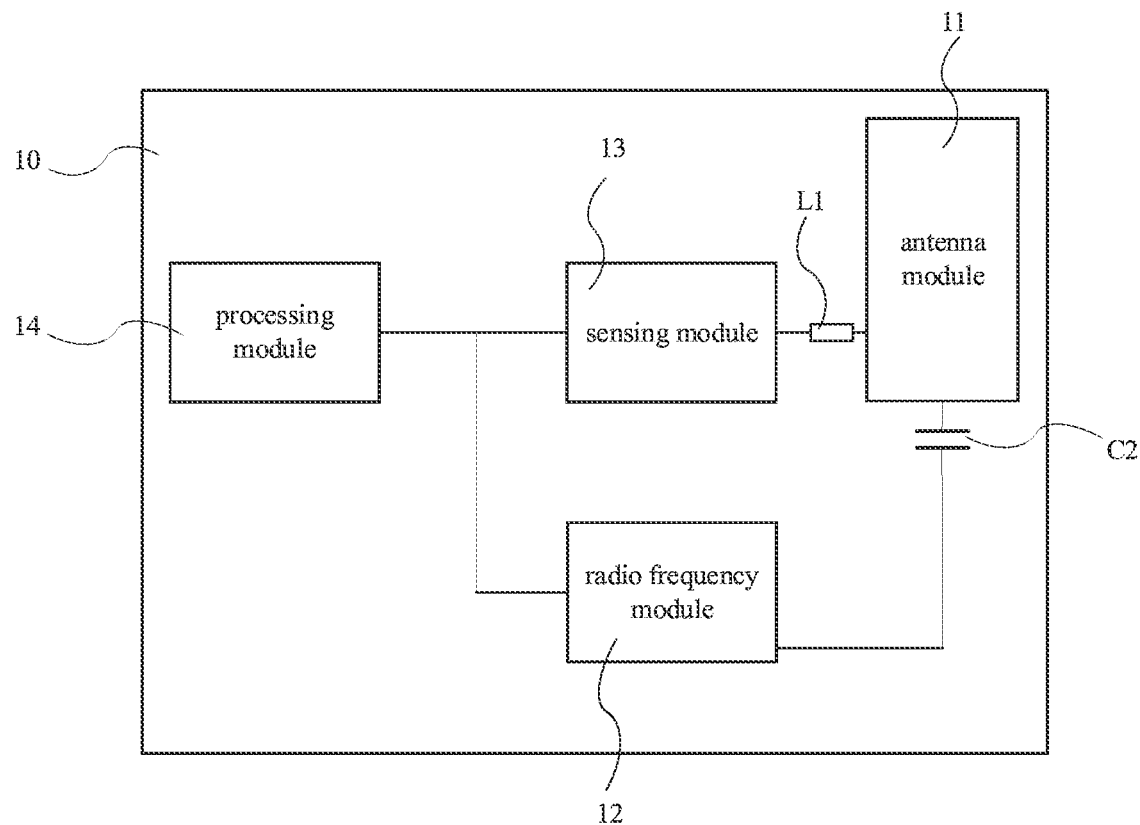
FIG. 3 illustrates schematic views of a structure of the smart glasses according to a third embodiment of the present invention.

Please refer to FIG. 3. FIG. 3 illustrates a schematic view of a structure of the smart glasses according to a third embodiment of the present invention. In an embodiment, the radio frequency module 12 is coupled with the antenna module 11 through a second capacitor structure C2.

In an embodiment, the second capacitor structure C2 may be a distributed capacitor structure or a lumped distributed capacitor structure. The capacitor structure of the second capacitor structure C2 may be identical to or different from that of the first capacitor structures C1a or C1b.

In an embodiment, the sensing module 13 may be coupled with the antenna modules 11 through a first inductor L1. The second capacitor structure C2 can isolate the low frequency signals, and the first inductor L1 can isolate the high frequency signals. Therefore, the radio frequency module 12 and the sensing module 13 will not interfere with each other. The radio frequency module 12 and the sensing module 13 can share the antenna module 11 as a radiator, thereby saving cost and component space.

In an embodiment, the processing module 14 is further used to determine the distance between an object (such as a part of a human body) and the antenna module 11 or whether the object contacts the antenna module 11 according to the sensing signal. For example, the processing module 14 can determine the gesture-control from the user or if the glasses being put on the user's head according to the sensing signal.

Figure 4:
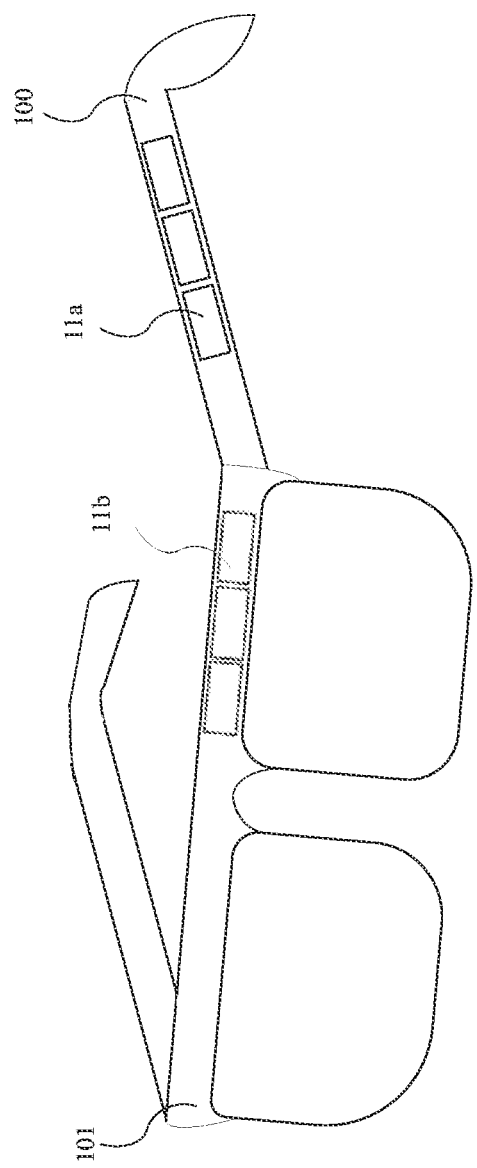
FIG. 4 illustrates schematic views of a structure of the smart glasses according to a fourth embodiment of the present invention.

Please refer to FIG. 4. FIG. 4 illustrates a schematic view of a structure of the smart glasses according to a fourth embodiment of the present invention. In an embodiment, the body 10 further comprises a temple 100 and a rim 101, which are connected to each other, and wherein the antenna module 11a is disposed on the temple 100 and the antenna module 11b is disposed on the rim 101. The antenna module 11a and the antenna module 11b may receive radio frequency signals from different directions to extend the coverage of the antenna for receiving signals. In other embodiments, the smart glasses may comprise only the antenna module 11a or the antenna module 11b or comprise more antenna modules 11.

Figure 5:
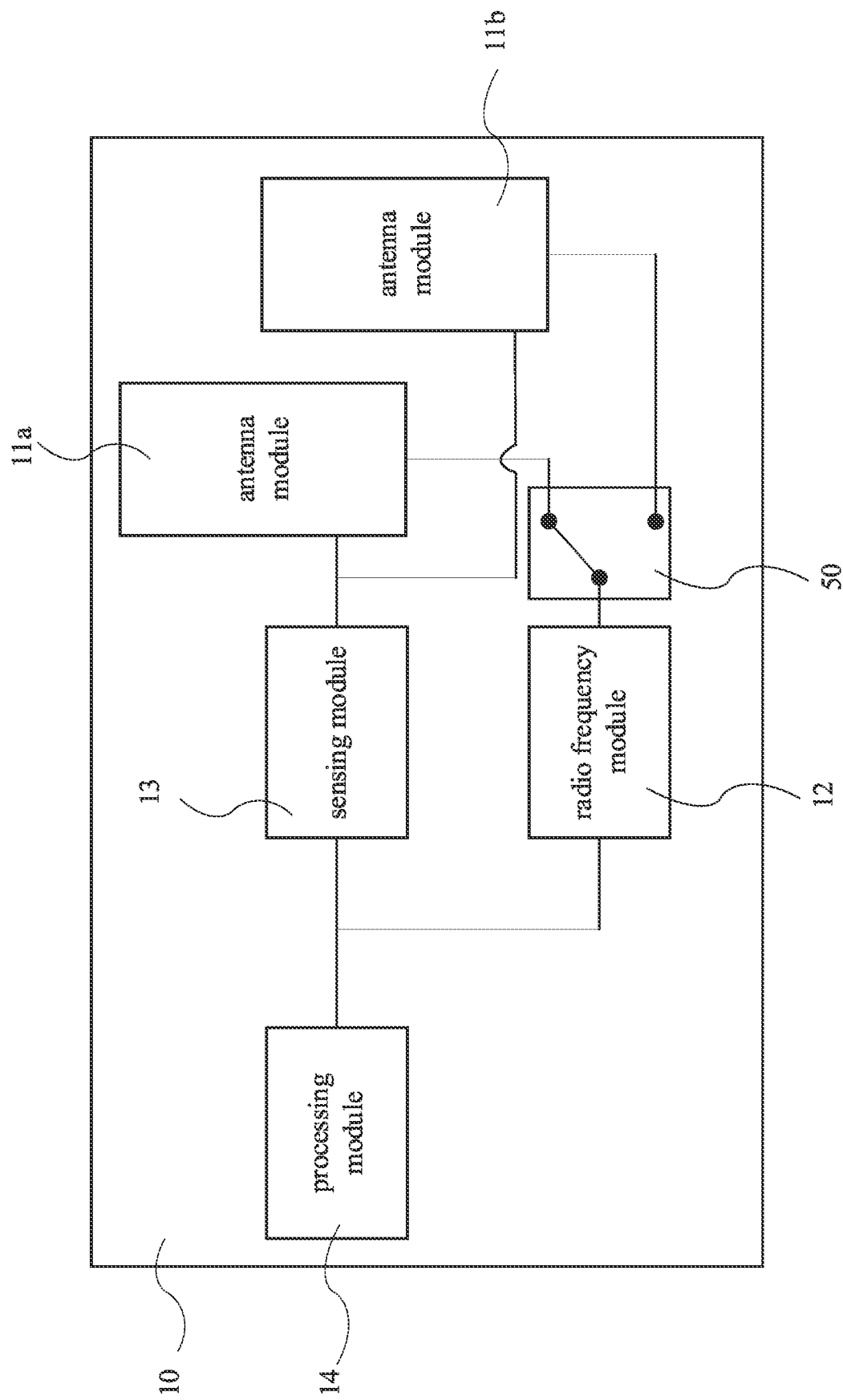
FIG. 5 illustrates schematic views of a structure of the smart glasses according to a fifth embodiment of the present invention.

Please refer to FIG. 5. FIG. 5 illustrates a schematic view of a structure of the smart glasses according to a fifth embodiment of the present invention. In an embodiment, the smart glasses may comprise a plurality of antenna modules 11a, 11b and further comprise a radio frequency switch 50. The radio frequency switch 50 is connected the radio frequency module 12 with the antenna module 11a and the antenna module 11b. The radio frequency switch 50 is used to connect the radio frequency module 12 to the antenna module 11a or 11b according to strength of the radio frequency signals received or transmitted by the antenna module 11a and 11b. For example, when the radio frequency signals received by the antenna module 11a is stronger, the radio frequency switch 50 would connect the electric circuit between the radio frequency module 12 and the antenna module 11a to keep better communication quality.

Figure 6:
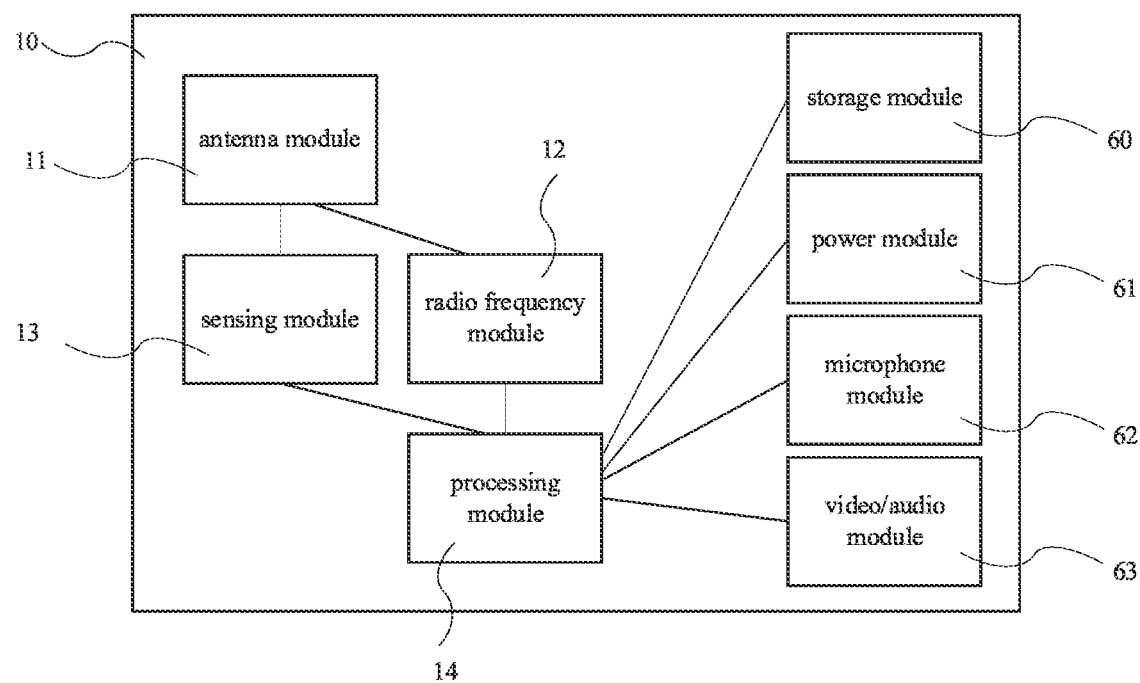
FIG. 6 illustrates a block diagram of the smart glasses according to a sixth embodiment of the present invention.

FIG. 6 illustrates a block diagram of the smart glasses according to a sixth embodiment of the present invention. In an embodiment, the smart glasses 1 can further comprise a storage module 60. The storage module 60 is connected with the processing module 14, and the storage module 60 is used to store applications or other digital information for the processing module 14. The storage module 60 can be, but not limited to, a storage chip.

In an embodiment, the smart glasses can further comprise a power module 61. The power module 61 is connected with the processing module 14, and the power module 61 is used to supply required power to the radio frequency module 12, the sensing module 13 and the processing module 14 for the operation thereof. The power module 61 can be a lithium battery, but not limited to.

In an embodiment, the smart glasses can further comprise a microphone module 62. The microphone module 62 is connected with the processing module 14, and the microphone module 62 is used to convert an external audio signal into a digital audio signal.

In an embodiment, the smart glasses can further comprise a video/audio module 63. The a video/audio module 63 is connected with the processing module 14, and the application run by the processing module 14 is further used to control the video/audio module to play corresponding video/audio signal. The video/audio module 63 may be, but not limited to, a speaker or a projection device.

In summary, the smart glasses according to the present invention comprise a at least one antenna disposed on the body and the radio frequency module and the sensing module share the antenna module as a radiator. Therefore, the function of wearing detection and gesture-control in the smart glasses of the present invention may be achieved at the same time. The function of gesture-control is achieved by integrating the existing antenna, so it is not required to add too many additional components compared to the prior art. The inner space of the smart glasses can be used efficiently. Moreover, the antenna module may comprise a plurality of conductor elements to sense the user's operation gesture.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. Smart glasses, comprising:
    a body;
    a plurality of antenna modules disposed on the body;
    a radio frequency module coupled with the antenna modules and the radio frequency module is used to receive or transmit a radio frequency signal by the antenna modules;
    a sensing module coupled with the antenna modules and the sensing module is used to sense a capacitance value of a parasitic capacitance of the antenna modules and generate a corresponding sensing signal;
    a processing module connected with the radio frequency module and the sensing module, wherein the processing module is used to run a corresponding application according to the radio frequency signal or the sensing signal; and
    a radio frequency switch connected the radio frequency module with the plurality of antenna modules, and the radio frequency switch is used to connect the radio frequency module to either of the plurality of antenna modules according to strength of the radio frequency signals received or transmitted by the plurality of antenna modules.

2. The smart glasses of claim 1, wherein the antenna modules comprise a plurality of conductor elements; wherein the plurality of conductor elements are coupled to each other through a first capacitor structure.

3. The smart glasses of claim 2, wherein the first capacitor structure is a distributed capacitor structure or a lumped distributed capacitor structure.

4. The smart glasses of claim 1, wherein the radio frequency module is coupled with the antenna modules through a second capacitor structure.

5. The smart glasses of claim 4, wherein the second capacitor structure is a distributed capacitor structure or a lumped distributed capacitor structure.

6. The smart glasses of claim 1, wherein the sensing module is coupled with the antenna modules through a first inductor.

7. The smart glasses of claim 1, wherein the processing module is further used to determine a distance between a first object and the antenna modules or whether the first object contacts the antenna modules according to the sensing signal.

8. The smart glasses of claim 1, wherein the body further comprises a temple and a rim, which are connected to each other, wherein the is antenna modules are disposed on the temple or the rim.

9. The smart glasses of claim 1, further comprising:
a storage module connected with the processing module, and the storage module is used to store the application.

10. The smart glasses of claim 1, further comprising:
a power module connected with the processing module, and the power module is used to supply required power to the radio frequency module, the sensing module and the processing module for the operation thereof.

11. The smart glasses of claim 1, further comprising:
a microphone module connected with the processing module, and the microphone module is used to convert an external audio signal into a digital audio signal.

12. The smart glasses of claim 1, further comprising:
a video/audio module connected with the processing module, and the application is used to control the video/audio module to play corresponding video/audio signal.

\* \* \* \* \*